US011767067B2

(12) United States Patent
Olsson et al.

(10) Patent No.: US 11,767,067 B2
(45) Date of Patent: Sep. 26, 2023

(54) JOINT FOR MOUNTING AN ELONGATE ELEMENT TO A STRUCTURAL ELEMENT IN A VEHICLE

(71) Applicant: Volvo Truck Corporation, Gothenburg (SE)

(72) Inventors: Anders Olsson, Torslanda (SE); Larry Hiltunen, Torslanda (SE); Jan Hendriks, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/524,221

(22) Filed: Nov. 11, 2021

(65) Prior Publication Data

US 2022/0169318 A1    Jun. 2, 2022

(30) Foreign Application Priority Data

Dec. 1, 2020   (EP) ..................................... 20210890

(51) Int. Cl.
*B60G 9/00* (2006.01)
*B60G 11/10* (2006.01)
(Continued)

(52) U.S. Cl.
CPC ............ *B62D 27/065* (2013.01); *B60G 11/10* (2013.01); *B62D 21/11* (2013.01); *B62D 21/12* (2013.01); *B60G 2204/15* (2013.01)

(58) Field of Classification Search
CPC ...... B62D 27/065; B62D 21/11; B62D 21/12; B60G 11/10; B60G 2204/15;
(Continued)

(56) References Cited

U.S. PATENT DOCUMENTS

| 2005/0253351 A1* | 11/2005 | Pan ....................... B60G 11/113 280/124.116 |
| 2013/0320644 A1* | 12/2013 | Wilson ...................... F16F 1/26 280/124.11 |
| 2016/0031279 A1 | 2/2016 | Aalderink et al. |

FOREIGN PATENT DOCUMENTS

| CN | 107351605 A | 11/2017 |
| DE | 102016012773 A1 | 6/2017 |

(Continued)

OTHER PUBLICATIONS

Description Translation for DE 102016/012773 from Espacenet (Year: 2017).*

(Continued)

*Primary Examiner* — Jason D Shanske
*Assistant Examiner* — Daniel M. Keck
(74) *Attorney, Agent, or Firm* — Withrow & Terranova, PLLC

(57) ABSTRACT

A joint for mounting an elongate element to a structural element in a vehicle, comprising a first and a second clamping portion, tightening elements configured to tighten the first and second clamping portions towards each other so that when the elongate element is arranged between the first and second clamping portions, the elongate element becomes clamped, a first and a second support portion, wherein the first and second support portions are spaced from each other and extend from the first clamping portion to the second clamping portion, wherein when the elongate element is arranged between the first and second clamping portions and the tightening elements tighten the first and second clamping portions, then at least one of the first and second clamping portions is configured to press at least one of the support portions towards the other one so that the elongate element becomes laterally contacted.

14 Claims, 6 Drawing Sheets

(51) Int. Cl.
*B60G 11/27* (2006.01)
*B60G 11/28* (2006.01)
*B62D 21/11* (2006.01)
*B62D 21/12* (2006.01)
*B62D 27/06* (2006.01)

(58) Field of Classification Search
CPC ........ B60G 2200/31; B60G 2204/4306; B60G 9/003; B60G 11/27; B60G 11/28; B60G 2202/152; B60G 2204/126; B60G 2204/148; B60G 2204/44; B60G 2204/4402; B60G 2204/4404
See application file for complete search history.

(56) References Cited

FOREIGN PATENT DOCUMENTS

| | | | | |
|---|---|---|---|---|
| EP | 1475254 | A2 | 11/2004 | |
| EP | 1574366 | A1 | 9/2005 | |
| EP | 1475254 | A3 | 9/2006 | |
| JP | 2001010318 | A * | 1/2001 | ............. B60G 9/003 |
| WO | WO-0179010 | A1 * | 10/2001 | ............. B60G 11/00 |

OTHER PUBLICATIONS

Description Translation for WO 0179010 from Espacenet (Year: 2001).*
Extended European Search Report for European Patent Application No. 20210890.8, dated Apr. 29, 2021, 8 pages.

* cited by examiner

JOINT FOR MOUNTING AN ELONGATE ELEMENT TO A STRUCTURAL ELEMENT IN A VEHICLE

RELATED APPLICATIONS

The present application claims priority to European Patent Application No. 20210890.8, filed on Dec. 1, 2020, and entitled "JOINT FOR MOUNTING AN ELONGATE ELEMENT TO A STRUCTURAL ELEMENT IN A VEHICLE," which is incorporated herein by reference in its entirety.

TECHNICAL FIELD

The present disclosure relates to a joint for mounting an elongate element to a structural element in a vehicle. The present disclosure also relates to an arrangement comprising such a joint. The present disclosure also relates to a vehicle comprising such a joint or such an arrangement.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

When mounting an air spring member to a fabricated vehicle axle, the air spring member is normally fixated to the axle by means of a lower and an upper seat. The upper seat should ideally deform to clamp the axle. This causes high stresses and strains in the upper seat. The upper seat needs to be designed so that it can be mounted even if the axle is at maximum tolerance width and the upper seat is at minimum tolerance width. Under normal conditions (and even worse when the axle is at minimum tolerance width) there is a gap between the upper seat and the axle. During tightening the gap is ideally closed by deforming the upper seat. Screws that are used for tightening the gap run the risk of becoming bent, and are subjected to large force amplitudes, which results in shortened fatigue life and premature loosening.

The above is just one example of an elongate element (axle) being mounted to a structural element (air spring member) in which the discussed drawbacks may occur. In a vehicle, similar challenges may occur at other joints for mounting an elongate element to a structural element. For instance, another example of such an elongate element is a bunch of blade springs. Another example of a structural element is a leaf spring member.

Thus, it would be desirable to mitigate the above mentioned drawbacks identified in connection with joints for mounting an elongate element to a structural element in a vehicle.

SUMMARY

An object of the invention is to provide a joint which mitigates at least some of the drawbacks of existing joints. This and other objects which will become apparent in the following disclosure is achieved by a joint.

The inventive concept is based on the insight that by providing appropriate support portions which are located laterally of the elongate element, it is possible to increase the joint stiffness in the clamping direction and thus reduce force amplitudes to tightening elements such as screws. The inventive concept is also based on the insight that by providing such support portions laterally of the elongate element, the risk of tightening elements (such as screws) bending while tightening can be avoided and tolerance variations of the clamped parts can be adapted to.

According to a first aspect of the inventive concept, there is provided a joint for mounting an elongate element to a structural element in a vehicle, comprising:
  a first clamping portion having a first seat facing in a first direction,
  a second clamping portion having a second seat facing in a second direction opposite to the first direction, one of the first and second clamping portions being configured to be in contact with, or forming an integral part of, the structural element to which the elongate element is to be mounted,
  tightening elements configured to tighten the first and second clamping portions towards each other so that when the elongate element is arranged between the first and second clamping portions, the elongate element becomes clamped by said first and second seats,
  a first support portion having a first supporting surface facing in a third direction perpendicular to the first and second directions,
  a second support portion having a second supporting surface facing in a fourth direction opposite to the third direction,
  wherein the first and second support portions are spaced from each other and extend from the first clamping portion to the second clamping portion, wherein when the elongate element is arranged between the first and second clamping portions and the tightening elements tighten the first and second clamping portions, then at least one of the first and second clamping portions is configured to press at least one of the first and second support portions towards the other one of the first and second support portions so that the elongate element becomes laterally contacted by said first and second supporting surfaces.

By the provision of support portions which are located laterally of the elongate element a large joint stiffness is achieved in the first and second directions. In particular, the clamped parts (the clamped parts are those clamped by the tightening elements, i.e. including the first and second clamping portions, the elongate element and the first and second support portions) will have a large stiffness in the first and second directions. Thus, the support portions may be regarded as a stiffening bridge between the first and the second clamping portions. Furthermore, the relative movement of the support portions conveniently adapt to tolerance variations.

It should be understood that in this disclosure, either one of the first and second clamping portions may be configured to be in contact with the structural element to which the elongate element is to be mounted. The other one of the clamping portions should be able to be tightened relative to the one that is in contact with the structural element. In fact, it should be understood that the structural element may even comprise one of the first and second clamping portions, i.e. the clamping portion forming an integral part of the structural element. On the other hand, it should be understood that in embodiments in which the clamping portion does not form an integral part of the structural element, but is merely in contact with the structural element, then that clamping portion may be fixated by suitable means, such as screws, nuts, bolts, etc, or may simply be placed in contact with the structural element without any dedicated fixating means (in which case the clamping force provided by the tightening element may be enough to keep the clamping portion in place at the structural element).

It should be understood that, although the tightening elements may suitably be in the form of screws, other type of tightening elements, such as U-bolts are also conceivable.

It should also be understood that the first and the second support portions may both be movable, or in some exemplary embodiments only one of them is movable. The relevant consideration is that the first and second support portions should be movable relative to each other, irrespective if one or both of them move in a fixed coordinate system.

According to at least one exemplary embodiment, at least one of the first and second clamping portions has at least one inclined surface which form non-zero angles relative to the first, second, third and fourth directions, wherein said inclined surface is configured to press one of the first and second support portions towards the other one when the first and second clamping portions are tightened towards each other. By providing an inclined surface, when the clamping portion is tightened towards the other clamping portion part of the tightening force in the first or second direction will, because of the inclined surface be transferred to a force in the third or fourth direction so that the support portion which receives the inclined surface of the clamping portion becomes pressed towards the other support portion. Suitably, each one of the clamping portions may have such an inclined surface. In fact, one or both of the clamping portions may have two such inclined surfaces, one for each support portion.

Although the support portions do not necessarily need to have a matching surface with the same angle as the inclined surface of the clamping portion in order for the directional shift of the force to take place, the support portions as such may suitably have similar angled surfaces. It should also be understood that instead of the clamping portion having the inclined surface, the directional shift could be achieved by just having an angled surface on the support portions. In such case, regardless of the shape or inclination of the clamping portion, when the angled support portion receives a force in the first or second direction, the angled surface of the support portion will provide two force components, one directed in the same direction as the incoming force, and the other one directed perpendicularly, i.e. towards the other support portion.

Thus, in a general sense, in accordance with at least one exemplary embodiment, at least one of the first and second support portions has at least one angled surface which forms a non-zero angle relative to the first, second, third and fourth directions, wherein said angled surface is configured to be pressed by one of the first and second clamping portions when tightened towards each other so that said support portion provided with the angled surface is pressed towards the other support portion. Suitably, one or both support portions may have an angled surface for each one of the first and second clamping portions.

Thus, according to at least one exemplary embodiment, at least one of the support portions, suitably each one of the support portions, has two angled surfaces, wherein one of the two angled surfaces is configured to be pressed by the first clamping portion, and the other one of the two angled surfaces is configured to be pressed by the second clamping portion. This provides a balanced movement of the support portion that is being pressed.

According to at least one exemplary embodiment, each one of said at least one inclined surface (of the first and/or second clamping portion) is configured to mate with and press against a respective one of said at least one angled surface (of the first and/or second support portion) when the first and second clamping portions are tightened towards each other. By having matching inclined/angled surfaces the force transfer area may be larger and the force transfer may be more efficient.

According to at least one exemplary embodiment, each one of said first and second support portions are separate components from the first and second clamping portions. By having both support portions as separate components, it may be more convenient to prepare the joint before clamping. Having the support portions as separate components may also be advantageous as they may then be replaceable by other support components. For instance, depending on the dimensions of the particular elongate element to be clamped, it may be desirable to have support portions of certain dimensions. It is, however, conceivable, in other exemplary embodiments, to have one of the first and second support portions formed in one piece with at least one of the first and second clamping portions, while the other one of the support portions is a separate component.

According to at least one exemplary embodiment, each one of the first and second support surfaces is recessed, presenting two spaced apart contacting areas for supporting the elongate element, and a recessed area located between the two contacting areas. This is advantageous as it avoids putting pressure on the central part of the elongate element. For instance, if the elongate element is in the form of an axle, such as a hollow square axle, then the risk of buckling the axle is reduced by only putting pressure at the corners of the axle.

According to at least one exemplary embodiment, each one of the first and second support surfaces is concave. Similar to above, this is advantageous as it avoids putting pressure on the central part of the elongate element.

According to at least one exemplary embodiment, the tightening elements extend adjacent to, and out of contact, from the support portions. By providing the tightening element spaced apart from the support portions, their functions and motions will not interfere with each other.

According to at least one exemplary embodiment, the tightening elements extend between the first and the second clamping portions. In some exemplary embodiments, the tightening elements do not continue to extend all the way into the structural element. This may be a suitable way to clamp the elongate element, in case one of the clamping portions is a separate component which has been fixated to the structural element. However, in other exemplary embodiments, for example in cases where one of the clamping portions is just placed to the structural element (and thus not necessarily firmly fixated to the structural element), then the tightening elements may extend from the other clamping portion to the structural element. Hereby the structural element and one of the clamping portions will together provide a clamping force to the intermediately located other clamping portion and the elongate element. This is at least partly reflected in the following example.

Thus, according to at least one exemplary embodiment, the tightening elements are configured to extend from the first clamping portion through and beyond the second clamping portion, and configured to be connected directly to the structural element. In other exemplary embodiments the tightening elements are configured to extend from the first clamping portion, past the second clamping portion, to the structural element. Thus, in some general exemplary embodiments, the tightening elements are configured to extend from the first clamping portion beyond the second clamping portion (e.g. through or bypassing it), and configured to be connected directly to the structural element.

According to a second aspect of the inventive concept, there is provided an arrangement comprising a joint according to the first aspect, the arrangement further comprising said elongate element and said structural element, wherein the elongate element is clamped between the first and second clamping portions and laterally contacted by the first and second support portions. The advantages of the arrangement of the second aspect, including any embodiments thereof, largely correspond to the advantages of the joint of the first aspect, including any embodiments thereof.

According to at least one exemplary embodiment of the arrangement, the elongate element is an axle, wherein the joint is an axle joint. For instance, the axle may has a square section. However, other cross sections, such as circular, are also conceivable. In other exemplary embodiments, the elongate element may be a bunch of blade springs. In some exemplary embodiments, the structural element to which the elongate element is attached connected may, for instance, be an air spring member or a leaf spring member, etc. or any other structural element of a vehicle to which an elongate element may be connected by the joint according to the present inventive concept.

According to a third aspect of the present inventive concept, there is provided a vehicle comprising a joint according to the first aspect or an arrangement according to the second aspect. The advantages of the vehicle of the third aspect, including any embodiments thereof, largely correspond to the advantages of the joint of the first aspect and the advantages of the arrangement of the second aspect, including any embodiments thereof.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
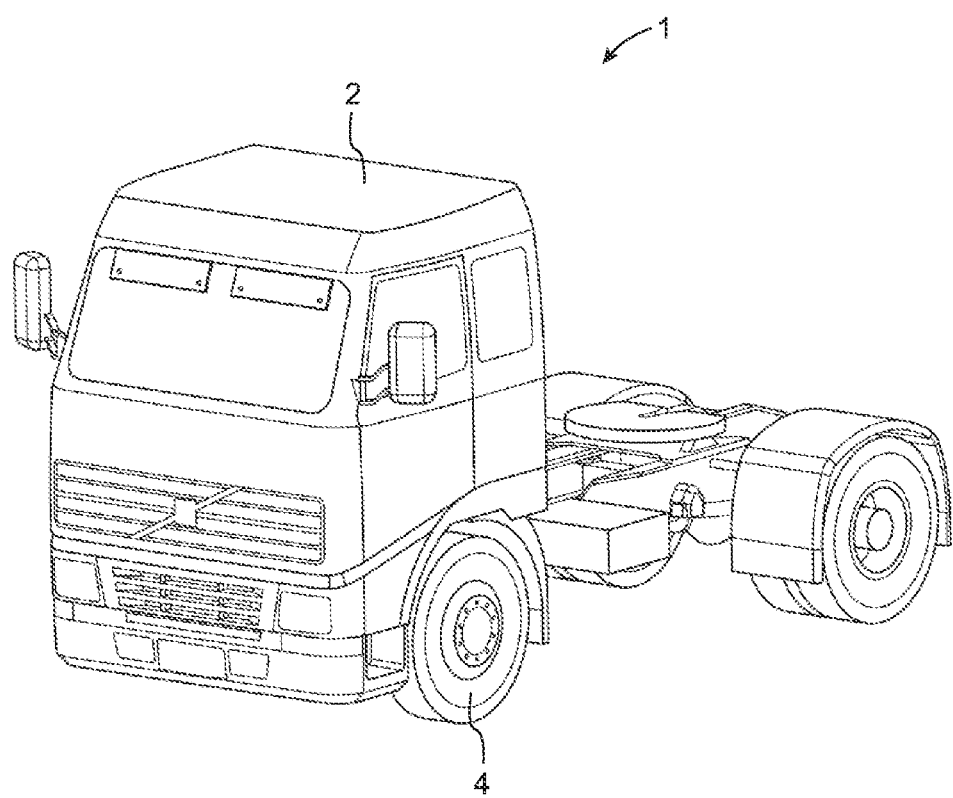
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle 1) comprises a cab 2 in which a driver may operate the vehicle 1. The vehicle comprises a number of road wheels 4, herein illustrated as two pairs of wheels, however, in other embodiments there may be a different number of wheels, such as three pairs, four pairs or more. The vehicle 1 may comprise various structural elements, such as air spring members, for smooth driving. An elongate element, such as an axle, of the vehicle 1 may be connected to such a structural element by a joint (not shown in FIG. 1). Although FIG. 1 may illustrate a human-operated vehicle 1, in other exemplary embodiments, the vehicle 1 in FIG. 1 may represent an autonomous vehicle. The vehicle 1 may comprise any embodiment of a joint disclosed herein, or any embodiment of an arrangement comprising such a joint disclosed herein. For instance, the vehicle 1 may comprise any one of the arrangements and joints exemplified in FIGS. 2-6.

Figure 2:
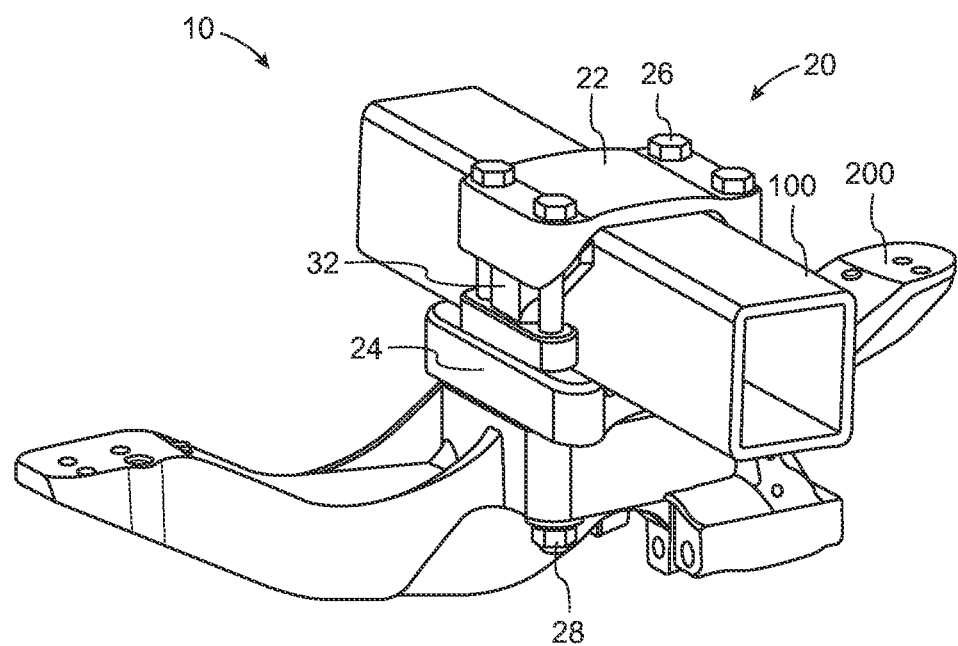
FIG. 2 illustrates in a perspective view an arrangement comprising a joint, in accordance with at least one exemplary embodiment of the invention.
Figure 3:
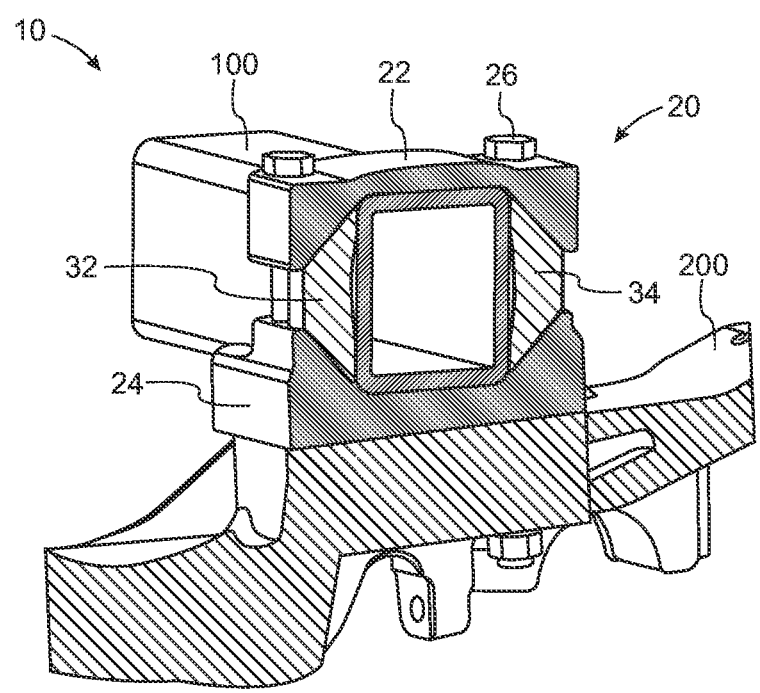
FIG. 3 illustrates a cross-sectional view of the arrangement in FIG. 2.
Figure 4:
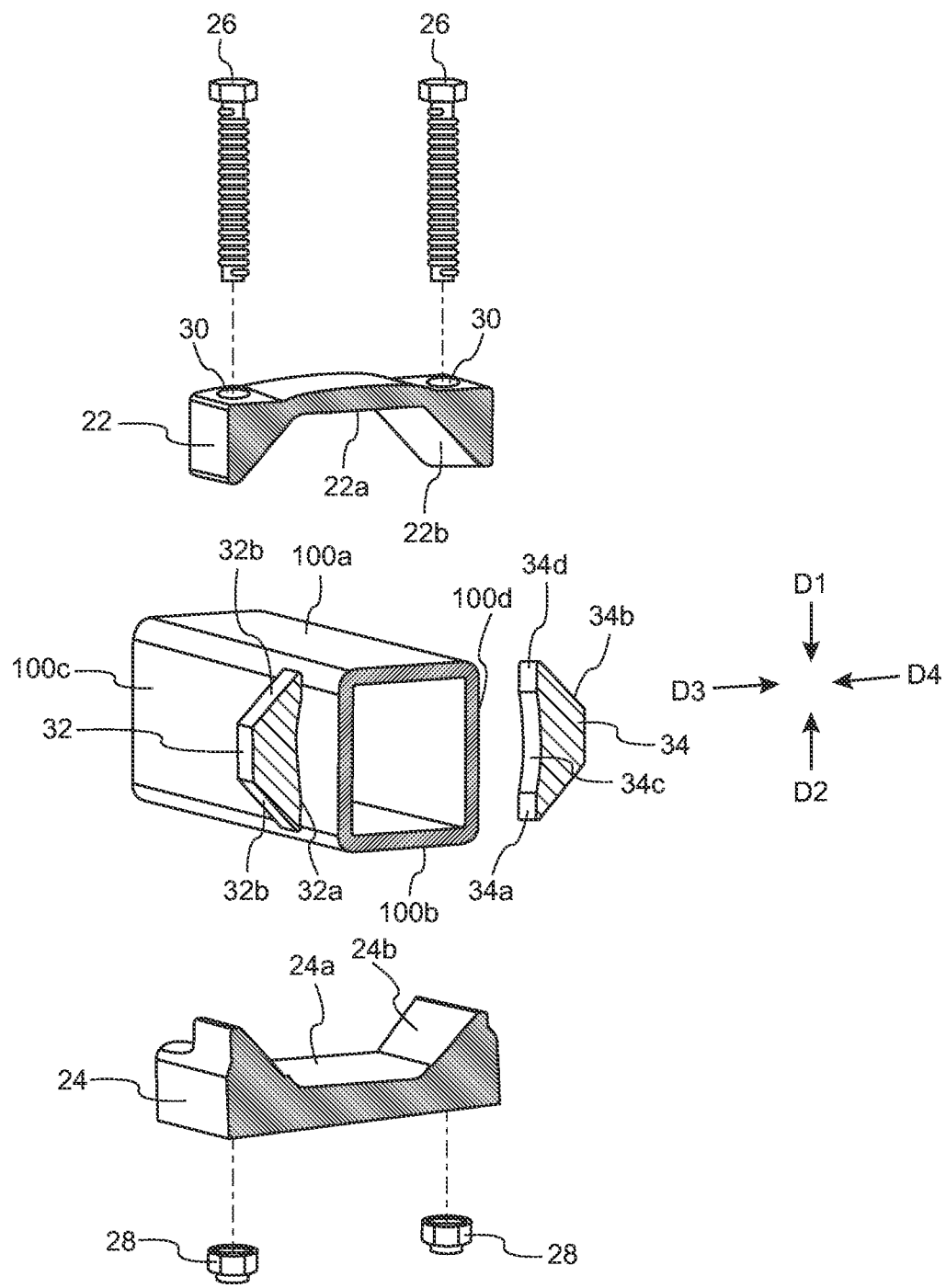
FIG. 4 illustrates an exploded view of some of the parts shown in FIG. 3.

FIG. 2 illustrates in a perspective view an arrangement 10 comprising a joint 20, in accordance with at least one exemplary embodiment of the invention. FIG. 3 illustrates a cross-sectional view of the arrangement 10 and joint 20 in FIG. 2. FIG. 4 illustrates an exploded view of some of the parts shown in FIG. 3. As can be seen in these figures the arrangement 10 comprises, in addition to the joint 20, an elongate element 100 and a structural element 200, wherein the elongate element 100 is by means of the joint 20 connected to the structural element 200. In these exemplifying illustrations, the elongate element 100 is depicted in the form of an axle, in particular a square axle being hollow inside. The structural element 200 has been depicted as an air spring member. It should, however, be understood that the general inventive concept is readily applicable to any appropriate elongate vehicle element that is to be connected to any appropriate structural element in the vehicle. Some other examples of elongate elements and structural elements have already been mentioned previously in this disclosure.

The joint 20 comprises a first clamping portion 22, here illustrated as an upper clamping portion, and a second clamping portion 24, here illustrated as a lower clamping portion. It should, however, be understood that although the first and second clamping portions 22, 24, as well as the elongate element 100, are illustrated as being located above the structural element 200, in other exemplary embodiments it is conceivable to connect the elongate element 100 below a structural element, thus, locating the first and second clamping portions 22, 24 below such a structural element.

The first clamping portion 22 comprises a first seat 22a (see FIG. 4) facing in a first direction D1. In the present illustration, the first direction D1 is vertically downwards, however, as will be appreciated, in other arrangements the joint may be differently oriented, and thus the first direction may be different from the one illustrated in the figures. The first seat 22a is designed and configured to abut and press the elongate element 100 when it is clamped. In this exemplary illustration the first seat 22a abuts a first surface area 100a of the elongate element 100, such as an upper surface area of the elongate element 100.

The second clamping portion 24 comprises a second seat 24a (see FIG. 4). The second seat 24a faces in a second direction D2 which is opposite to the first direction D1. Thus, in the present illustration, the second seat 24a faces vertically upwards. The second seat 24a is designed and configured to abut and press the elongate element 100 when it is clamped. In this exemplary illustration the second seat 24a abuts a second surface area 100b of the elongate element 100, such as a lower surface area of the elongate element 100.

In the illustrated example (see for instance FIGS. 2 and 3), the second clamping portion 24 is configured to be in contact with the structural element 200 to which the elongate element 100 is to be mounted. The second clamping portion 24 may, for instance, be fixated to the structural element 200 by means of bolts. However, in other exemplary embodiments, the second clamping portion may form an integral part of, i.e. made in one piece with, the structural element. In the present illustration the second clamping portion 24 is held in contact with the structural element 200 by means of tightening elements 26. Here the tightening elements 26 are illustrated as screws which engage with nuts 28 at an underside of the structural element 200 (see for instance FIGS. 2 and 4).

Thus, the joint 20 also comprises tightening elements 28 configured to tighten the first and second clamping portions 22, 24 towards each other so that when the elongate element 100 is arranged between the first and second clamping portions 22, 24, the elongate element 100 becomes clamped by said first and second seats 22*a*, 24*a*. Although the tightening elements 26 in the illustrated example are shown in the form of screws, it should be understood that other tightening elements such as U-bolts are also conceivable. There are four tightening elements 26 illustrated, however, it is conceivable to have a different number in other exemplary embodiments. The tightening elements 26 may suitably extend through openings 30 (see FIG. 4) in the first and second clamping portions 22, 24. The openings 30 and the tightening elements 26 extending there through are suitably spaced apart from the first and second seats 22*a*, 24*a*. Counter elements such as said nuts 28 may suitably be provided outside one of the clamping portions, or outside the structural element 200 as in the exemplary illustration, with which a respective threaded shaft of the tightening elements 26 may engage. The tightening elements 26 may suitably be provided with a head or other configuration which prevents the entire tightening element to pass through the openings 30 in the clamping portions. By rotating the tightening elements 26 and/or nuts 28, the tightening elements 26 will press the first and second clamping portions 22, 24 towards each other. Thus, the first seat 22*a* will press the elongate element 100 from one direction, while the second seat 24*a* will press the elongate element 100 form an opposite direction, thereby clamping the elongate element 100 between the clamping portions 22, 24. Since the second clamping portion 24 is held in place relative the structural element 200, the elongate element 100 will via the joint 20 be connected to the structural element 100. As already mentioned, the second clamping portion 24 may in other exemplary embodiments be fixated to the structural element 200 by means of separate bolts, screws, nuts or other appropriate fixating means. In the illustrated embodiment, however, the second clamping portion 24 is held in place by the tightening elements 26 extending from the first clamping portion 22 all the way through and past the structural element 200 where they are engaged by thread interaction with the nuts 28 or the like.

With reference to FIGS. 3 and 4, the joint 20 further comprises a first support portion 32 having a first supporting surface 32*a* facing in a third direction D3 perpendicular to the first and second directions D1, D2. In the illustrated example, the third direction D3 is a horizontal direction. Similarly, the joint 20 comprises a second support portion 34 having a second supporting surface 34*a* facing in a fourth direction D4 opposite to the third direction D3. Thus, in the present examples, the fourth direction D4 is an opposite horizontal direction.

The first and second support portions 32, 34 are spaced from each other and extend from the first clamping portion 22 to the second clamping portion 24. Furthermore, the joint 20 is configured in such way that when the elongate element 100 is arranged between the first and second clamping portions 22, 24 and the tightening elements 26 tighten the first and second clamping portions 22, 24, then at least one of the first and second clamping portions 22, 24 is configured to press at least one of the first and second support portions 32, 34 towards the other one of the first and second support portions 32, 34 so that the elongate element 100 becomes laterally contacted by said first and second supporting surfaces 32*a*, 34*a*. Thus, when the support portions 32, 34 have stopped moving and have come into contact with the elongate element 100, then the clamping force in the first and second directions D1, D2 (vertical direction in the figures) may be at least partly taken up by the support portions 32, 34. It is readily understandable that this stiffening bridge between the clamping portions 22, 24, which is achieved by the support portions 32, 34, increases the stiffness of the clamped parts in the first and second directions D1, D2 compared to if no such support portions would be provided. Thus, because of the provision of the support portions 32, 34, the clamped parts, i.e. the parts clamped between the head of the tightening elements 26 (the screw head in the figures) and the nuts 28, have increased stiffness in the first and second directions D1, D2 compared to the prior art. Thus, the support portions 32, 34 provide stiffness to the joint 20 and avoid bending and premature fatiguing wear of the tightening elements 26. In other words, the support portions 32, 34 provide a more robust joint 20. Furthermore, because at least one of the support portions 32, 34 is movable, the joint 20 adapts to tolerances.

Although the first clamping portion 22 has been illustrated as a bracket provided with a seat 22*a*, it should be understood that in other exemplary embodiments, the first clamping portion may form part of some other element, such as for instance an air spring.

As best seen in FIG. 4, each one of the first and second clamping portions 22, 24 has inclined surfaces 22*b* and 24*b*, respectively, which form non-zero angles relative to the first, second, third and fourth directions D1-D4. Similarly, each one of the first and second support portions 32, 34 has angled surfaces 32*b* and 34*b*, respectively, which form non-zero angle relative to the first, second, third and fourth directions D1-D4. These inclined surfaces 22*b*, 24*b* and the mating angled surfaces 32*b*, 34*b* cause the first and second support portions 32, 34 to be pressed towards each other when the first and second clamping portions 22, 24 are tightened towards each other. It should, however, be understood that this is just one of many different conceivable ways to transfer the forces (here vertical forces) from one or both of the clamping portions 22, 24 to a pressing force (here horizontal force) acting on one or both of the support portions 32, 34. Instead of having the herein illustrated four inclined surfaces 22*b*, 24*b* acting on four angled surfaces 32*b*, 34*b*, it would in practice be conceivable to have only a single inclined surface and no angled surface, or only a single angled surface and no inclined surface, for the force transfer and switching of force directions to take place.

Thus, from the above it should be understood that in some exemplary embodiments at least one of the first and second clamping portions 22, 24 has at least one inclined surface 22*b*, 24*b* which forms non-zero angles relative to the first, second, third and fourth directions D1-D4. In at least some exemplary embodiments, at least one of the first and second support portions 32, 34 has at least one angled surface 32*b*, 34*b* which forms a non-zero angle relative to the first, second, third and fourth directions D1-D4. In at least some exemplary embodiments, at least one of the support portions 32, 34, suitably each one of the support portions, has two angled surfaces 32b, 34b, wherein one of the two angled surfaces is configured to be pressed by the first clamping portion 22, and the other one of the two angled surfaces is configured to be pressed by the second clamping portion 24. In at least some exemplary embodiments, each one of said at least one inclined surface 22b, 24b is configured to mate with and press against a respective one of said at least one angled surface 32b, 34b, when the first and second clamping portions 22, 24 are tightened towards each other.

As can be seen in FIGS. 2, 3 and 4, each one of the first and second support portions 32, 34 are separate components from the first and second clamping portions 22, 24. However, in other exemplary embodiments, such as in FIG. 6, one of the support portions may be formed in one piece with one of the first and second clamping portions. Thus, it should be understood that the present inventive concept, can be implemented and realized in various different ways. The basic idea of transferring the moving force from at least one of the clamping portions to a support portion (or to both support portions) to reduce the relative distance between the support portions in order for them (specifically their supporting surfaces) to come into contact with and laterally support the elongate element is conceivable with various different configurations and embodiments.

In this disclosure, the term lateral implies from the side. Thus, the fact that the elongate element becomes laterally contacted by the first and second supporting surfaces 32a, 34a means that the first and second supporting surfaces 32a, 32b come into contact with and support in the previously discussed third and fourth direction D3, D4, respectively. Thus, the elongate element may have a third area 100c which is supported laterally by the first supporting surface 32a, and an opposite fourth area 100d, which is laterally supported by the second supporting surface 34a. The third and fourth areas 100c, 100d of the elongate element 100 may, as in the illustrated example, extend from the first area 100a to the second area 100b of the elongate element 100.

As can be seen in FIG. 4, second support surface 34a is recessed, presenting two spaced apart contacting areas 34d for supporting the elongated element 100, and a recessed area 34c located between the two contacting areas 34d. The first support surface 32a has a corresponding recessed area located between two contacting areas (although not as clearly visibly in the view of FIG. 4). Thus, as can be seen, the first and second support surfaces 32a, 34a may suitably be concave. In the illustrated example, in which the elongate element 100 is in the form of a square axle, the spaced apart contacting areas 34d on either side of the recessed area 34c are beneficial since buckling of the axle may be avoided, which would have been a risk if pressure would have been applied to the central parts of the axle by the supporting surfaces 32a, 34a. Since the tightening elements 26 extend at locations that are laterally spaced from the first and second seat 22a, 24a of the first and second clamping portions 22, 24 (at four corners of the clamping portions), respectively, the largest force acting on the first and second area 100a, 100b of the elongate element 100 will also be off-centre, therefore also reducing the risk of buckling the elongate element 100.

Each tightening element 26 extends adjacent to, and out of contact from the support portions 32, 34. Thus, the support portions 32, 34 are freely movable without being hindered by the tightening elements 26. Depending on the particular design of the clamping portions, 22, 24 the tightening element 26 may extend laterally of the support portion 32, 34 or, as shown in the illustrated examples, axially of the support portions 32, 34. In this disclosure, axially refers to the longitudinal direction of the elongate element 100.

Although the tightening elements 26 may be short and only extend from the first and the second clamping portions, they may suitably extend from the first clamping portion 22 through and beyond the second clamping portion 24, and be connected directly to the structural element 200. In some exemplary embodiments, the tightening elements may extend from the first clamping portion, past the second clamping portion, to the structural element.

Figure 5:
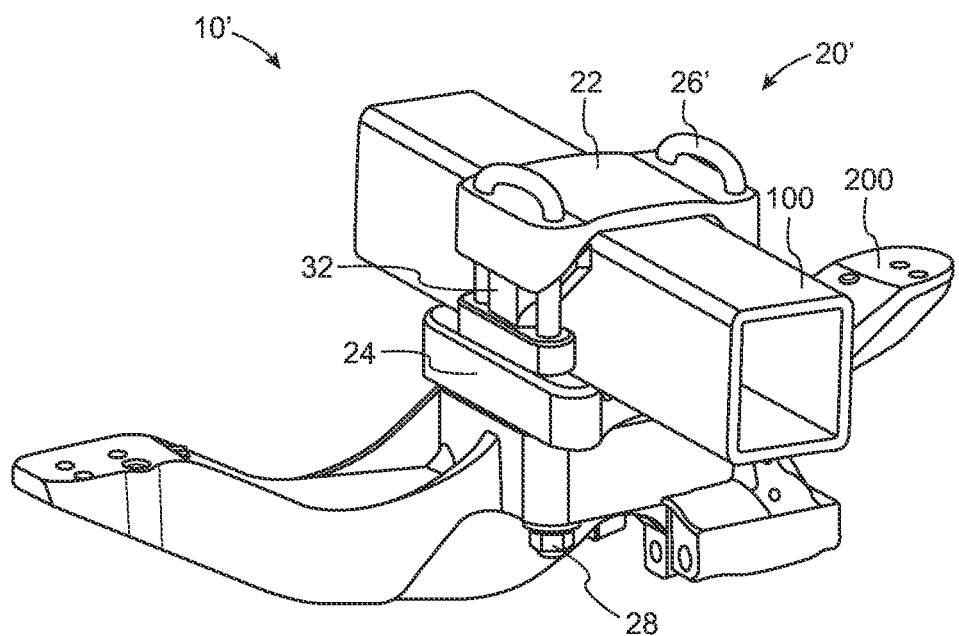
FIG. 5 illustrates in a perspective view an arrangement comprising a joint, in accordance with at least another exemplary embodiment of the invention.

FIG. 5 illustrates in a perspective view an arrangement 10' comprising a joint 20', in accordance with at least another exemplary embodiment of the invention. In the present exemplary embodiment, the tightening elements 26' are in the form of two U-bolts. Each U-bolt may be tightened by two nuts 28 to achieve the clamping action of the joint. The other parts of the arrangement 10' and the joint 20' may include any one of the other features disclosed in this specification and/or illustrated in the drawings. Thus, same reference numerals for corresponding parts have been used as in the previous drawings.

Figure 6:
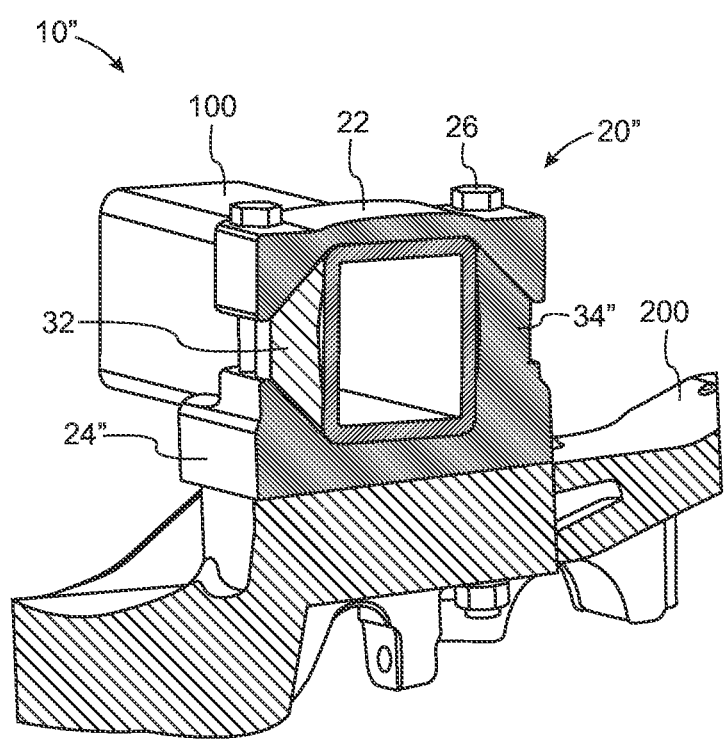
FIG. 6 illustrates a cross-sectional view of an arrangement, in accordance with at least yet another exemplary embodiment of the invention.

FIG. 6 illustrates a cross-sectional view of an arrangement 10", in accordance with at least yet another exemplary embodiment of the invention. The arrangement 10" comprises a joint 20" as in the previous embodiments. However, in this exemplary embodiment one of the support portions (the second support portion 34', i.e. the right one in the figure) is formed in one piece with the second clamping portion 24'. Thus, when the first and second clamping portions 22, 24" are tightened towards each other and press the first and second support portions 32, 34", then the only substantial movement will be by the other support portion (the first support portion 32, i.e. the left one in the figure). Thus, the first support portion 32 will be pressed towards the second support portion 34" so that the elongate element 100 becomes laterally supported by the supporting surfaces of the first and second support portions 32, 34". The illustrated exemplary embodiment may be modified in accordance with any other features (such as U-bolts, connection between second clamping portion and structural element 200, etc.) as disclosed in this specification and/or illustrated in the drawings.

It is to be understood that the present invention is not limited to the embodiments described above and illustrated in the drawings; rather, the skilled person will recognize that many changes and modifications may be made within the scope of the appended claims.

The invention claimed is:

1. A joint for mounting an elongate element to a structural element in a vehicle, comprising:
 a first clamping portion having a first seat facing in a first direction,
 a second clamping portion having a second seat facing in a second direction opposite to the first direction, one of the first and second clamping portions being configured to be in contact with, or forming an integral part of, the structural element to which the elongate element is to be mounted,
 tightening elements configured to tighten the first and second clamping portions towards each other so that when the elongate element is arranged between the first and second clamping portions, the elongate element becomes clamped by the first and second seats,
 a first support portion having a first supporting surface facing in a third direction perpendicular to the first and second directions, and a second support portion having a second supporting surface facing in a fourth direction opposite to the third direction, wherein the first and second support portions are spaced from each other and extend from the first clamping portion to the second clamping portion, wherein when the elongate element is arranged between the first and second clamping portions and the tightening elements tighten the first and second clamping portions, then at least one of the first and second clamping portions is configured to press at least one of the first and second support portions towards the other one of the first and second support portions so that the elongate element becomes laterally contacted by the first and second supporting surfaces;

wherein at least one of the first and second clamping portions has at least one inclined surface which forms non-zero angles relative to the first, second, third, and fourth directions, wherein the at least one inclined surface is configured to press one of the first and second support portions towards the other one when the first and second clamping portions are tightened towards each other.

2. The joint of claim 1, wherein at least one of the first and second support portions has at least one angled surface which forms a non-zero angle relative to the first, second, third, and fourth directions, wherein the at least one angled surface is configured to be pressed by one of the first and second clamping portions when tightened towards each other so that the support portion provided with the at least one angled surface is pressed towards the other support portion.

3. The joint of claim 2, wherein at least one of the support portions, suitably each one of the support portions, has two angled surfaces, wherein one of the two angled surfaces is configured to be pressed by the first clamping portion, and the other one of the two angled surfaces is configured to be pressed by the second clamping portion.

4. The joint of claim 2, wherein at least one of the first and second clamping portions has at least one inclined surface which forms non-zero angles relative to the first, second, third, and fourth directions, wherein the inclined surface is configured to press one of the first and second support portions towards the other one when the first and second clamping portions are tightened towards each other, wherein each one of the at least one inclined surface is configured to mate with and press against a respective one of the at least one angled surface when the first and second clamping portions are tightened towards each other" should read, "The joint of claim 3, wherein each one of the at least one inclined surface is configured to mate with and press against a respective one of the at least one angled surface when the first and second clamping portions are tightened towards each other.

5. The joint of claim 1, wherein each one of the first and second support portions are separate components from the first and second clamping portions.

6. The joint of claim 1, wherein each one of the first and second support surfaces is recessed, presenting two spaced apart contacting areas for supporting the elongate element, and a recessed area located between the two contacting areas.

7. The joint of claim 6, wherein each one of the first and second support surfaces is concave.

8. The joint of claim 1, wherein the tightening elements extend adjacent to, and out of contact, from the support portions.

9. The joint of claim 1, wherein the tightening elements extend between the first and the second clamping portions.

10. The joint of claim 9, wherein the tightening elements are configured to extend from the first clamping portion through and beyond the second clamping portion, and configured to be connected directly to the structural element.

11. The joint of claim 1, wherein the tightening elements are configured to extend from the first clamping portion, past the second clamping portion, to the structural element.

12. A joint for mounting an elongate element to a structural element in a vehicle, comprising:

a first clamping portion having a first seat facing in a first direction, a second clamping portion having a second seat facing in a second direction opposite to the first direction, one of the first and second clamping portions being configured to be in contact with, or forming an integral part of, the structural element to which the elongate element is to be mounted, tightening elements configured to tighten the first and second clamping portions towards each other so that when the elongate element is arranged between the first and second clamping portions, the elongate element becomes clamped by the first and second seats, a first support portion having a first supporting surface facing in a third direction perpendicular to the first and second directions, and a second support portion having a second supporting surface facing in a fourth direction opposite to the third direction, wherein the first and second support portions are spaced from each other and extend from the first clamping portion to the second clamping portion, wherein when the elongate element is arranged between the first and second clamping portions and the tightening elements tighten the first and second clamping portions, then at least one of the first and second clamping portions is configured to press at least one of the first and second support portions towards the other one of the first and second support portions so that the elongate element becomes laterally contacted by the first and second supporting surfaces; and wherein at least one of the first and second support portions has at least one angled surface which forms a non-zero angle relative to the first, second, third, and fourth directions, wherein the at least one angled surface is configured to be pressed by one of the first and second clamping portions when tightened towards each other so that the support portion provided with the at least one angled surface is pressed towards the other support portion.

13. A joint for mounting an elongate element to a structural element in a vehicle, comprising:

a first clamping portion having a first seat facing in a first direction, a second clamping portion having a second seat facing in a second direction opposite to the first direction, one of the first and second clamping portions being configured to be in contact with, or forming an integral part of, the structural element to which the elongate element is to be mounted, tightening elements configured to tighten the first and second clamping portions towards each other so that when the elongate element is arranged between the first and second clamping portions, the elongate element becomes clamped by the first and second seats, a first support portion having a first supporting surface facing in a third direction perpendicular to the first and second directions, and a second support portion having a second supporting surface facing in a fourth direction opposite to the third direction, wherein the first and second support portions are spaced from each other and extend from the first clamping portion to the second clamping portion, wherein when the elongate element is arranged between the first and second clamping portions and the tightening elements tighten the first and second clamping portions, then at least one of the first and second clamping portions is configured to press at least one of the first and second support portions towards the other one of the first and second support portions so that the elongate element becomes laterally contacted by the first and second supporting surfaces; and wherein each one of the first and second support portions are separate components from the first and second clamping portions.

14. A joint for mounting an elongate element to a structural element in a vehicle, comprising:

a first clamping portion having a first seat facing in a first direction, a second clamping portion having a second seat facing in a second direction opposite to the first direction, one of the first and second clamping portions being configured to be in contact with, or forming an integral part of, the structural element to which the elongate element is to be mounted, tightening elements configured to tighten the first and second clamping portions towards each other so that when the elongate element is arranged between the first and second clamping portions, the elongate element becomes clamped by the first and second seats, a first support portion having a first supporting surface facing in a third direction perpendicular to the first and second directions, and a second support portion having a second supporting surface facing in a fourth direction opposite to the third direction, wherein the first and second support portions are spaced from each other and extend from the first clamping portion to the second clamping portion, wherein when the elongate element is arranged between the first and second clamping portions and the tightening elements tighten the first and second clamping portions, then at least one of the first and second clamping portions is configured to press at least one of the first and second support portions towards the other one of the first and second support portions so that the elongate element becomes laterally contacted by the first and second supporting surfaces; and wherein each one of the first and second support surfaces is recessed, presenting two spaced apart contacting areas for supporting the elongate element, and a recessed area located between the two contacting areas.

* * * * *